(12) United States Patent
Huhn et al.

(10) Patent No.: US 12,515,846 B2
(45) Date of Patent: Jan. 6, 2026

(54) BULK SHIPPER PALLET AND ISOLATOR FOR BULK FREEZING APPLICATIONS

(71) Applicant: Sartorius Stedim North America Inc., Bohemia, NY (US)

(72) Inventors: Matthew Huhn, Queens, NY (US); Joseph Deacutis, Coram, NY (US); Jake Duerwald, Smithtown, NY (US)

(73) Assignee: Sartorius Stedim North America Inc., Bohemia, NY (US)

( * ) Notice: Subject to any disclaimer, the term of this patent is extended or adjusted under 35 U.S.C. 154(b) by 131 days.

(21) Appl. No.: 18/647,658

(22) Filed: Apr. 26, 2024

(65) Prior Publication Data

US 2025/0333207 A1    Oct. 30, 2025

(51) Int. Cl.
*B65D 19/38*    (2006.01)
*B65D 19/00*    (2006.01)

(52) U.S. Cl.
CPC ......... *B65D 19/38* (2013.01); *B65D 19/0095* (2013.01); *B65D 2519/00024* (2013.01); *B65D 2519/00059* (2013.01); *B65D 2519/00273* (2013.01); *B65D 2519/00293* (2013.01);
(Continued)

(58) Field of Classification Search
CPC ............... B65D 19/38; B65D 19/0095; B65D 2519/00024; B65D 2519/00059; B65D 2519/00273; B65D 2519/00293; B65D 2519/00323; B65D 2519/00333; B65D 2519/00736; F16F 1/3737
USPC ................ 206/386; 248/560, 615, 634, 635; 108/25, 42
See application file for complete search history.

(56) References Cited

U.S. PATENT DOCUMENTS

| 2,076,034 A | 4/1937 | Lampman |
| 4,503,935 A * | 3/1985 | Haffer ................... B66F 9/08 |
| | | 187/229 |
| 4,744,539 A | 5/1988 | Stimeling |

(Continued)

FOREIGN PATENT DOCUMENTS

| CN | 207669469 U | 7/2018 |
| CN | 207683994 U | 8/2018 |

(Continued)

OTHER PUBLICATIONS

International Search Report and Written Opinion for PCT/IB2025/053843, dated Sep. 15, 2025, 21 pgs.

*Primary Examiner* — Jacob K Ackun
(74) *Attorney, Agent, or Firm* — Womble Bond Dickinson (US) LLP

(57) ABSTRACT

An isolator includes a first section, a second section, and a third section is disclosed. The first section is configured to secure the isolator in a mount that is defined through a mounting section. The second section is disposed over the first section and is configured to be supported by a first surface of the mounting section. The third section is disposed on top of the second section such that the second section is sandwiched between the first section and the third section. The second section dampens forces exerted on the third section or the first section from being transmitted therebetween. A method for manufacturing a pallet that is configured to be frozen is also disclosed. The method includes friction stir welding along a first joining edge and second joining edge that are abutted together to joined together to form a first segment.

20 Claims, 5 Drawing Sheets

(52) U.S. Cl.
CPC .............. *B65D 2519/00323* (2013.01); *B65D 2519/00333* (2013.01); *B65D 2519/00736* (2013.01)

(56) References Cited

U.S. PATENT DOCUMENTS

| | | |
|---|---|---|
| 5,170,985 A | 12/1992 | Killworth |
| 5,242,147 A | 9/1993 | Kemeny |
| 7,263,806 B2 | 9/2007 | Pellegrino et al. |
| 7,607,564 B2 | 10/2009 | Churvis et al. |
| 8,327,775 B2 | 12/2012 | Fox Harris |
| 8,459,911 B1 | 6/2013 | Kim et al. |
| 8,783,461 B2 | 7/2014 | Hill et al. |
| 9,010,531 B2 | 4/2015 | Lowry et al. |
| 9,011,980 B1 | 4/2015 | Beaulieu |
| 9,475,608 B2 | 10/2016 | Dye et al. |
| 11,059,622 B2 | 7/2021 | Allegretti et al. |
| 11,260,631 B2 | 3/2022 | Buenger et al. |
| 11,286,083 B2 | 3/2022 | Lee et al. |
| 11,402,790 B2 | 8/2022 | Higashida et al. |
| 11,542,061 B2 | 1/2023 | Shuert et al. |
| 11,731,804 B2 | 8/2023 | Dehmel et al. |
| 11,955,653 B1 | 4/2024 | Zhao et al. |
| 2014/0246353 A1 | 9/2014 | Campagna et al. |
| 2014/0367546 A1* | 12/2014 | Hibi ................. F16F 1/3835 248/635 |
| 2015/0027351 A1 | 1/2015 | Marchek et al. |
| 2015/0376563 A1* | 12/2015 | Husemann ............ C12M 23/46 414/800 |
| 2016/0059989 A1 | 3/2016 | Green |
| 2021/0079972 A1* | 3/2021 | Euler-Rolle ............ F16F 3/093 |
| 2021/0122523 A1 | 4/2021 | Spadavecchia |
| 2021/0270337 A1* | 9/2021 | Rudek ................... F16F 1/3737 |
| 2022/0250831 A1 | 8/2022 | Couch |

FOREIGN PATENT DOCUMENTS

| | | |
|---|---|---|
| CN | 208377318 U | 1/2019 |
| CN | 110552259 B | 9/2021 |
| CN | 220483857 U | 2/2024 |
| CN | 221069127 U | 6/2024 |
| CN | 221394613 U | 7/2024 |
| CN | 221394638 U | 7/2024 |
| ES | 2975869 A1 | 7/2024 |
| JP | 291289 | 11/1995 |
| JP | 218182 | 8/1998 |
| JP | 2007030924 | 2/2007 |
| KR | 443105 Y1 | 1/2009 |
| KR | 1813216 B1 | 1/2018 |
| KR | 2484003 B1 | 1/2023 |
| KR | 2505516 B1 | 3/2023 |

* cited by examiner

BULK SHIPPER PALLET AND ISOLATOR FOR BULK FREEZING APPLICATIONS

BACKGROUND

1. Technical Field

The present disclosure relates to fluid handling and, more specifically, to a bulk shipper pallet and an isolator for a bulk shipper pallet suitable for freezing applications.

2. Discussion of Related Art

During manufacture, storage, and distribution of biopharmaceutical compositions, containers are filled and drained of biopharmaceutical compositions in a liquid state. For example, a biopharmaceutical composition is pumped from a production vessel into one or more storage containers. Once filled, the storage containers may be frozen, stored, and/or shipped to another facility. Before use, the biopharmaceutical composition within the storage containers is thawed and/or drained from the storage containers.

In some applications, containers, e.g., Celsius® FFT containers from Sartorius, are stacked and loaded onto pallets for shipping and processing. To be suitable for use, a pallet must be capable of interfacing with several pieces of equipment. During shipping and processing, the pallet may be manipulated by several pieces of equipment which require proper placement of the pallet with respect to the equipment. If a pallet is improperly placed, one or more containers supported on the pallet may fall which can cause damage to the container. Damage to the container can result in a loss of a product stored within the container.

The containers may be secured to a pallet by an isolator to reduce shock and energy inputted during vibration to the containers as a result of mechanical handling during shipping and processing. The pallets may be large containers such that 300 liters or more of product may be stored on a single pallet. The isolators should be capable of protecting the containers from seeing excessive forces during shipping and processing of the product in the containers including filling, transporting, freezing, and thawing.

SUMMARY

This disclosure relates generally to pallets that have accurate dimensioning and tolerancing such that the pallets are capable of being handled by a variety of equipment. The pallets allow for proper placement with the equipment to prevent damage to containers loaded on the pallets. In addition, this disclosure relates generally to an isolator that includes a dampener that is capable of reducing forces, or peak forces, from being experienced by containers secured to the isolator.

In an aspect of the present disclosure, a method includes abutting a first joining edge of a first top section of a first segment with a second joining edge of a second top section of a second segment. The method also includes friction stir welding along the abutted first joining edge and second joining edge such that the first segment and the second segment are joined along the first top section and the second top section.

In aspects, the method may include abutting a third joining edge of a third top section of a third segment with a fourth joining edge of the second top section of the second segment and friction stir welding along the abutted third joining edge and the fourth joining edge such that the third segment and the second segment are joined along the third top section and the second top section. The friction stir welding along the abutted first joining edge and the second joining edge may monolithically join the first top section and the second top section to form a pallet top section.

In some aspects, the method includes freezing the pallet. The pallet may have uniform contraction along a pallet top section during freezing of the pallet. The pallet top section may include the first top section and the second top section. Freezing the pallet may include freezing the pallet to a temperature of less than negative 40 degrees Celsius. The method may include thawing the pallet. The pallet may have uniform expansion along the pallet top section during thawing of the pallet.

In certain aspects, the method may include defining one or more mounts for isolators through the first top section. Defining the one or more mounts may include the mount extending through a first leg supporting the first top section. The method may include extruding the first segment and the second segment before abutting the first joining edge and the second joining edge. The method may include trimming the extruded first segment to a desired length and using another portion of the extruded first segment to form a third segment joined to an opposite side of the second top section of the second segment.

In another aspect of the present disclosure, a pallet includes a first segment having a first leg and a first top section. The first top section is supported on the first leg and extends from the first leg to a first joining edge. The pallet also includes a second segment having a second leg and a second top section. The second top section is supported on the second leg and extends from the first leg to a second joining edge. The first segment and the second segment are joined together along the first joining edge and the second joining edge to form the pallet. The pallet is configured to be frozen.

In aspects, the pallet includes a third segment having a third leg and a third top section. The third top section is supported on the first leg and extends from the first leg to a third joining edge. The second top section extends from the second leg to a fourth joining edge. The second segment and the third segment are joined together along the third joining edge and the fourth joining edge to form the pallet. The pallet may be formed of monolithic construction.

In some aspects, the first top section and the second top section may form a pallet top section. The pallet top section may have uniform contraction when frozen. The first joining edge and the second joining edge may extend an entire length of the pallet.

In another aspect of the present disclosure, a bulk shipper assembly includes a pallet according to any of the pallets disclosed herein. The bulk shipper also includes one or more isolators mounted to the pallet and one or more containers mounted on the isolator. Each container of the one or more containers is configured to hold a biopharmaceutical composition. The entire bulk shipper assembly is configured to be frozen.

In another aspect of the present disclosure, a pallet includes a first top section and has a first joining edge. The pallet also includes a second top section that has a second joining edge. The first top section and the second top section are joined together along the first joining edge and the second joining edge to form a pallet top section. The pallet top section has uniform construction when frozen.

In aspects, the pallet may include a third top section that has a third joining edge. The second top section may extend from the second joining edge to a fourth joining edge. The second top section and the third top section may be joined together along the third joining edge and the fourth joining edge such that the pallet top section extends from the first top section through the third top section.

In some aspects, the first joining edge and the second joining edge may extend an entire length of the pallet. The pallet may include a first leg monolithically formed with the first top section such that the first top section is supported on the first leg.

In another aspect of the present disclosure, an isolator includes a first section that is configured to secure the isolator in a mount defined through a mounting section. The isolator also includes a second section that is disposed over the first section and is configured to be supported by a first surface of the mounting section. The isolator also includes a third section that is disposed on top of the second section such that the second section is sandwiched between the first section and the third section. The second section dampens forces exerted on the third section or the first section from being transmitted therebetween.

In some aspects, the first section includes a first portion and a second portion. The first portion may be sized and dimensioned to prevent the first portion from passing through the mount. The second portion may extend from the first portion that is sized and dimensioned to pass through the mount. The second portion may be sized and dimensioned to fill the mount. The first portion may be configured to engage a second surface of the mounting section that is opposite the first surface. The second section may include a collar portion that defines a cavity and receives the second portion of the first section therein. The second section may include a disc portion that is disposed over the collar portion. The second portion of the first section may be received in the cavity.

In certain aspects, the isolator includes a dampening plate that is disposed between the second section and the third section. The dampening plate may be configured to distribute forces from the third section to the second section. The isolator may include a fastener that passes entirely through the first section, the second section, and the third section. The fastener may secure the first section, the second section, and the third section together. The first section may be formed of a first material, the second section may be formed of a second material, and the third section may be formed of a third material. The shore hardness of the second material may be less than a shore hardness of the first material or the third material.

In another aspect of the present disclosure, a bulk shipper assembly may include a pallet having a rectangular top section. The top section defines a mount that passes through the top section adjacent each corner of the rectangular top section. The top section has a first surface and a second surface that is opposite the first surface. The bulk shipper assembly also includes an isolator that is disposed in each mount. Each isolator is configured to support one or more containers on the pallet. Each isolator has a first section that secures the isolator in a respective mount of the pallet; a second section that is disposed over the first section and is supported by the first surface of the top section such that a portion of the top section is disposed between the first section and the second section; and a third section that is disposed on top of the second section such that the second section is sandwiched between the first section and the third section. The second section dampens forces that are exerted on the third section or the first section from being transmitted therebetween.

In aspects, the first section of each isolator includes a first portion and a second portion. The first portion may be disposed against the second surface of the top section to prevent the first portion from passing through the mount. The second portion may extend from the first portion and may pass through a respective mount of the top section. The second portion of each isolator may fill the respective mount.

In some aspects, the second section may include a collar portion that defines a cavity. The cavity may receive the second portion of the first section therein. The second section may include a disc portion that is disposed over the collar portion and the second portion of the first section. Each isolator may include a dampening plate that is disposed between the second section and the third section. The dampening plate may be configured to distribute forces from the third section to the second section. Each isolator may include a fastener that passes entirely through the first section, the second section, and the third section. The fastener may secure the first section, the second section, and the third section together. Each fastener may include a nut that is disposed adjacent to the third section. The nut may be threadably coupled to a shaft of the fastener.

In certain aspects, the bulk shipper assembly may include a container that is mounted on the nut of each fastener such that the container is supported on the pallet. The bulk shipper assembly may be capable of passing ASTM D4169 DC-2 (2017) protocol at assurance levels 1 and 2.

In another aspect of the present disclosure, a method includes inserting an upper portion of a first section of the isolator through a mount opening defined through a top segment. The method also includes positioning a second section of the isolator over the first section and engaged with a first surface of the top segment. The method also includes setting a third section over the second section. The second section is configured to absorb forces from the third section.

In aspects, the method may include securing a fastener through the first section, second section, and third section to secure the isolator within the mount opening. The method may also include mounting a fluid container on a nut of the fastener to secure the container to the isolator.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification.

DETAILED DESCRIPTION

Figure 1:
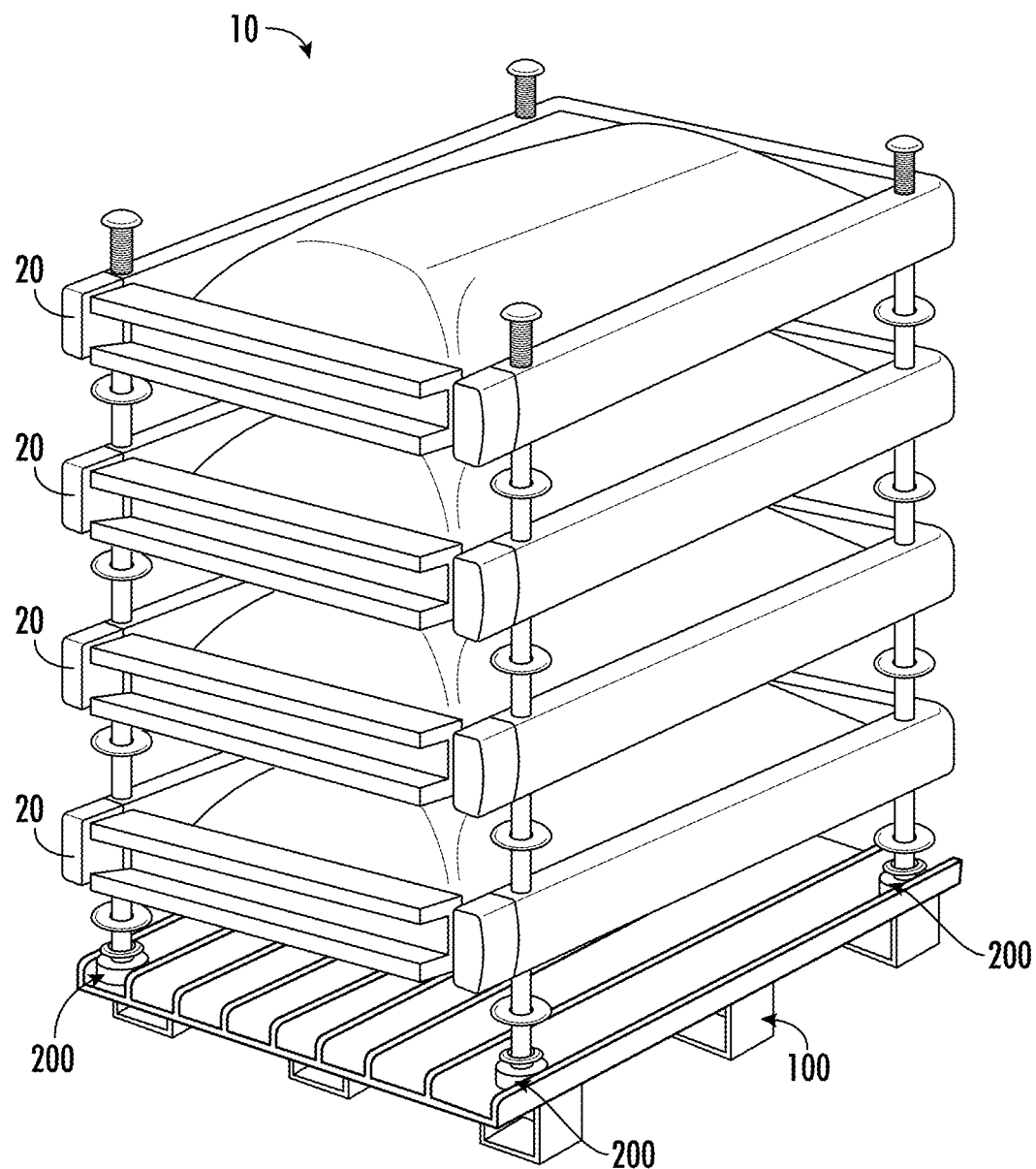
FIG. 1 is a perspective view of a bulk shipment provided in accordance with embodiments of the present disclosure including a bulk shipper pallet, isolators, and four storage containers secured to the isolators.

The present disclosure will now be described more fully hereinafter with reference to example embodiments thereof with reference to the drawings in which like reference numerals designate identical or corresponding elements in each of the several views. These example embodiments are described so that this disclosure will be thorough, complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like. Further, as used herein the term "biopharmaceutical compositions" refers to a product coming from biotechnology, culture environments, cell cultures, buffer solutions, artificial nutrition liquids, blood products and derivatives of blood products, a pharmaceutical product, or more generally a product intended to be used in the medical field including, without any limitation, monoclonal antibodies (mAbs), therapeutic proteins, viruses, lipid nanoparticles, vaccines, virus banks, exosomes, cell banks, and cell therapy products.

Referring now to FIG. 1, a bulk shipper assembly 10 is provided in accordance with the present disclosure. The bulk shipper assembly 10 includes a bulk shipper pallet 100, isolators 200, and four containers 20. As described in greater detail below, the bulk shipper pallet 100 is rectangular in shape and includes an isolator 200 adjacent each corner thereof. The pallet 100 and the isolators 200 are configured to support the containers 20 during processing and shipping such that the containers 20 are supported and isolated from mechanical forces as a result of engagement and manipulation of the pallet 100 by a variety of equipment. For example, the bulk shipper assembly 10 or the containers 20 thereof may be engaged or manipulated by an inverter, a freezer, a fill and drain station, an electric lift, a fluid testing machine, or other equipment.

To allow for the handling of the bulk shipper assembly 10 by a variety of equipment, the dimensions and the tolerances of the bulk shipper pallet 100 and/or the position of the isolators 200 may affect the suitability of the bulk shipper pallet 100. During processing, the bulk shipper pallet 100 may be lifted, tilted, or rotated by a variety of equipment. Misalignment of the bulk shipper assembly 10 with handling equipment may result in tip-over of the bulk shipper assembly 10 or contact with the containers 20. Tip-over or contact with the containers 20 may cause damage to the containers 20 and thus, loss of a product stored within the container 20. As the containers 20 on a single bulk shipper pallet 100 may contain 300 liters or more of a biopharmaceutical composition, loss of a single container 20 may be significant.

In addition to the dimensions and tolerances of the bulk shipper pallet 100, the position of the isolators 200 relative to the bulk shipper pallet 100 and/or to each other may result in an unbalance or misalignment of the containers 20. For example, the position of the containers 20 on the bulk shipper pallet 100 is controlled by the position of the isolators 200 adjacent the corners of the bulk shipper pallet 100. Misalignment of the position of the isolators 200 adjacent the corners of the bulk shipper pallet 100 may create an imbalance for the bulk shipper pallet 100 during handling. For example, when the bulk shipper pallet 100 is tilted, misalignment may shift the center of gravity such that the entire bulk shipper pallet 100 tips over causing a loss of all containers 20 supported on the bulk shipper pallet 100.

In addition, during processing and shipping, the bulk shipper pallet 100 may experience mechanical forces from impact, vibration, dropping, or other instances. One test for determining the suitability of a bulk shipper is ASTM D4169 DC-2 (2017) protocol at assurance levels 1 and 2. This test protocol may be used to evaluate the worthiness or the ability of a system to prevent damage to containers such as the containers 20 when supported on the bulk shipper pallet 100 by the isolators 200. As described below, prior art isolators 500 (FIG. 5) have been found to be insufficient to pass the ASTM D4169 DC-2 (2017) protocol at assurance levels 1 and 2. In particular, the isolators 500 fail rotation drop testing. As detailed below, the isolators 200 improve the ability of the bulk shipper assembly 10 to prevent the containers 20 from experiencing excessive forces such that the bulk shipper assembly 10 is capable of passing the ASTM D4169 DC-2 (2017) protocol at assurance levels 1 and 2.

Figure 2:
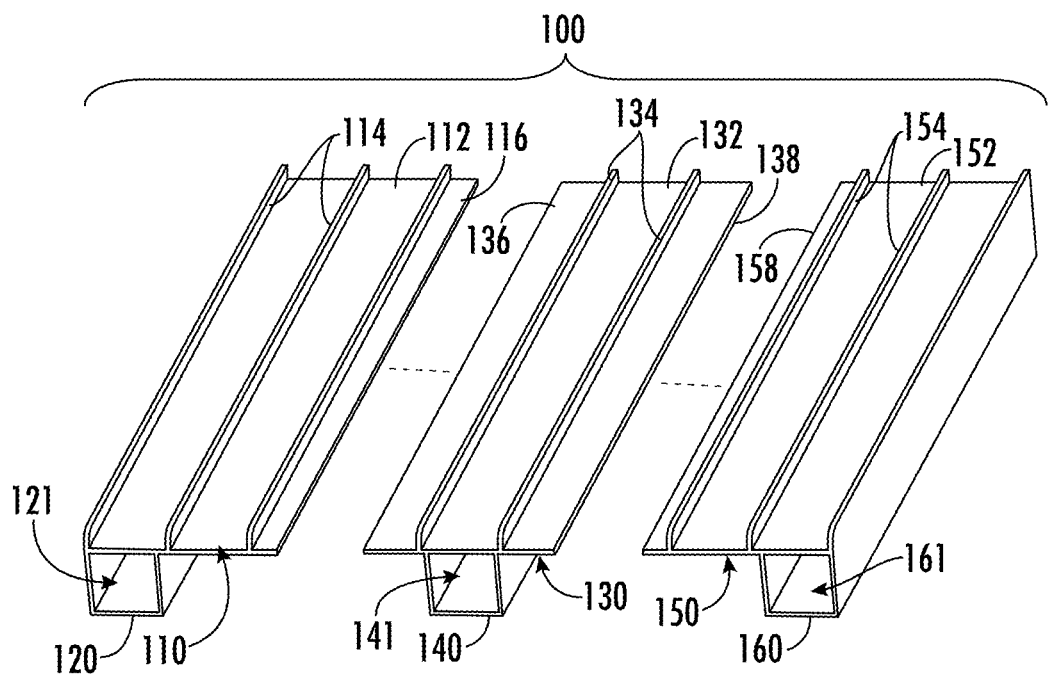
FIG. 2 is a perspective view, with parts separated, of the bulk shipper pallet of FIG. 1 before assembly of the bulk shipper pallet.
Figure 3:
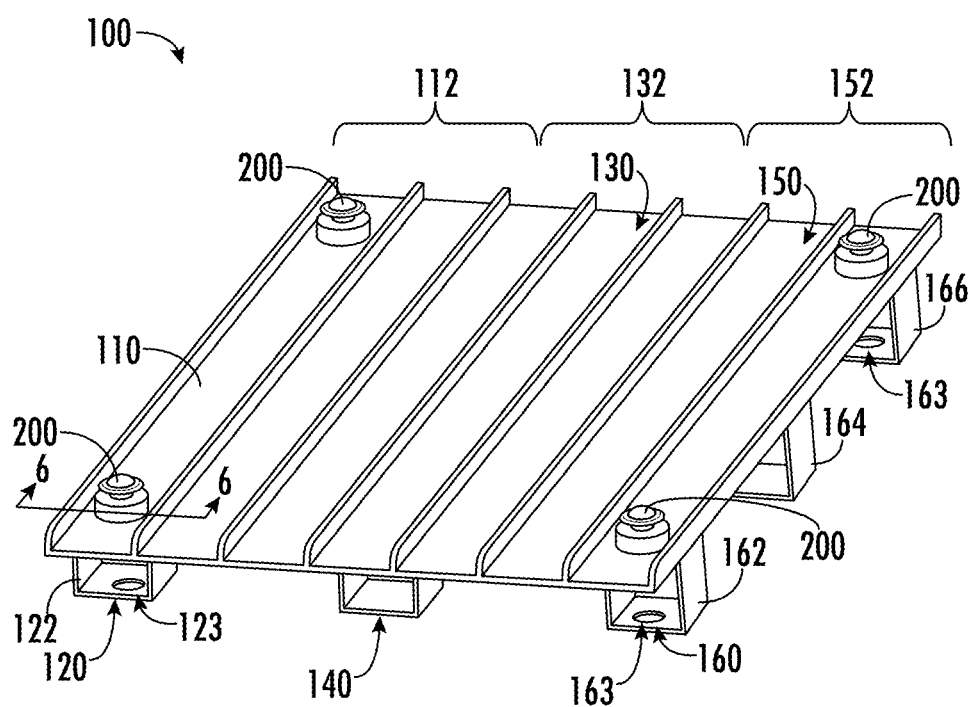
FIG. 3 is a perspective view of the bulk shipper pallet and isolators of FIG. 1.

Referring now to FIGS. 2 and 3, the bulk shipper pallet 100 is described in accordance with the present disclosure. The bulk shipper pallet 100 may be formed from a first side segment 110, a middle segment 130, and a second side segment 150. As detailed below, the three segments 110, 130, 150 are joined together in a manner such that the bulk shipper pallet 100 may have a monolithic or unitary construction.

The first side segment 110 includes a leg 120 and a top section 112 that is supported on the leg 120. In at least one embodiment, the first side segment 110 is extruded as one piece. The leg 120 may define a channel 121 that extends longitudinally through the leg 120. The top section 112 extends to one side of the leg 120, e.g., to the right, to a joining edge 116 thereof. The top section 112 may be cantilevered from the leg 120 to the joining edge 116. The top section 112 may include one or more ribs 114 that extend upward from the top section 112. The ribs 114 extend longitudinally along the top section 112. Without being bound to a particular theory, it is understood the ribs 114 strengthen the top section 112 to prevent or reduce bending thereof. Furthermore, it is understood the ribs 114 may prevent or reduce contact with the top section 112.

The middle segment 130 includes a leg 140 and a top section 132 that is supported on the leg 140. In at least one embodiment, the middle segment 130 is extruded as one piece. The leg 140 may define a channel 141 that extends longitudinally through the leg 140. The top section 132 extends to one side of the leg 140, e.g., to the left, to a first joining edge 136 and to the other side of the leg 140, e.g., to the right, to a second joining edge 138. The top section 132 may be positioned on the leg 140 such that the top section 132 forms a substantially T-shaped profile with the leg 140. The top section 132 may include one or more ribs 134 that extend upward from the top section 132. The ribs 134 extend longitudinally along the top section 132. Without being bound to a particular theory, it is understood the ribs 134 strengthen the top section 132 to prevent or reduce bending thereof. The ribs 134 may prevent or reduce contact with the top section 132.

The second side segment 150 includes a leg 160 and a top section 152 that is supported on the leg 160. In at least one embodiment the second side segment 150 is extruded as one piece. The leg 160 may define a channel 161 that extends longitudinally through the leg 160. The top section 152 extends to one side of the leg 160, e.g., to the left, to a joining edge 158 thereof. The top section 152 may be cantilevered from the leg 160 to the joining edge 158. The top section 152 may include one or more ribs 154 that extend upward from the top section 152. The ribs 154 extend longitudinally along the top section 152. Without being bound to a particular theory, it is understood the ribs 154 may strengthen the top section 152 to prevent or reduce bending thereof. The ribs 154 may prevent or reduce contact with the top section 152. The second side segment 150 may have the same profile as the first side segment 110 which is rotated 180 degrees such that the top section 152 extends to the left of the leg 160 in contrast to the top section 112 extending to the right of the leg 120.

Figure 4:
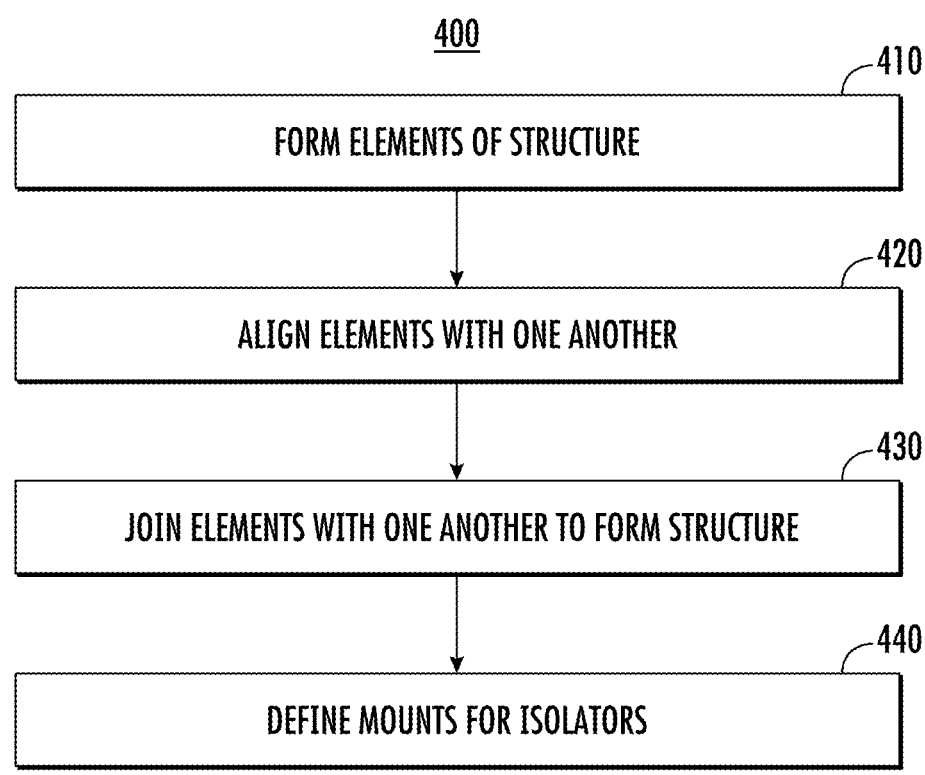
FIG. 4 is a flowchart of a method of manufacturing a bulk shipper pallet provided in accordance with embodiments of the present disclosure.

With reference to FIG. 4, a method of manufacturing the bulk shipper pallet 100 is described in accordance with the present disclosure and is referred to generally as method 400 with reference to the bulk shipper pallet 100 of FIGS. 2 and 3. The method 400 may be used to join the three segments 110, 130, 150 of the bulk shipper pallet 100 into a single monolithic or unitary unit. Initially, the method 400 includes forming the three elements of the structure, e.g., the three segments 110, 130, 150, of the bulk shipper pallet 100 (Step 410). The three segments 110, 130, 150 may be extruded from a metal such as aluminum, steel, or stainless steel. The first side segment 110 and the second side segment 150 may be formed from a single extrusion profile with one being rotated relative to the other. The middle segment 130 may be extruded from another extrusion profile. The extrusions may be made of continuous or undetermined length and cut to a desired length for each of the three segment 110, 130, 150.

With the segments 110, 130, 150 formed, the segments 110, 130, 150 are aligned with one another (Step 420). The first side segment 110 is aligned with the middle segment 130 by aligning the joining edge 116 of the first side segment 110 with the joining edge 136 of the middle segment 130 such that the joining edge 116 abuts the joining edge 136 with the ends of the edges 116, 136 terminating at the same point. The second side segment 150 is aligned with the middle segment 130 by aligning the joining edge 158 of the second side segment 150 with the joining edge 138 of the middle segment 130 such that the joining edge 158 abuts the joining edge 138 with the ends of the edges 138, 158 terminating at the same point.

The aligned segments 110, 130, 150 are joined together to form the structure of the bulk shipper pallet 100 (Step 430). The segments 110, 130, 150 may be joined by friction stir welding along the abutted joining edges. For example, the first side segment 110 may be joined with the middle segment 130 by friction stir welding along the abutted joining edges 116, 136 and the second side segment 150 may be joined with the middle segment 130 by friction stir welding along the abutted joining edges 138, 158. Friction stir welding along the joining edges forms a pallet top section of the pallet 100 that includes the sections 112, 132, 152. Friction stir welding along the joining edges may allow for control of the dimensions between the respective segments during the joining process. In some embodiments, the friction stir welding allows for the weld to lay flat without grinding or additional machining after welding. In certain embodiments, the friction stir welding allows for the joining of the segments without addition of material, e.g., filler. The tolerances of the structure of the bulk shipper pallet 100 may be improved by the weld lying flat and/or the lack of additional material being added during the joining process. It will be appreciated that the first side segment 110 may be aligned and joined with the middle segment 130 before the second side segment 150 is aligned with the middle segment 130. Likewise, it will be appreciated that the second side segment 150 may be aligned and joined with the middle segment 130 before the first side segment 110 is aligned with the middle segment 130. In certain embodiments, the first side segment 110, the middle segment 130, and the second side segment 150 are simultaneously aligned with one another and then simultaneously joined with one another. The friction stir welding may improve temperature variations, and effects therefrom, along the weld line, e.g., expansion, crystallization, residual stresses, and contraction, compared to MIG or TIG welding such that the bulk shipper pallet 100 formed with friction stir welding is capable of being used during the deep or cryogenic freezing and thawing process when loaded with one or more containers. Deep or cryogenic freezing may include freezing the pallet to a temperature of less than negative 40 degrees Celsius, negative 60 degrees Celsius, or less than negative 80 degrees Celsius. In contrast, it has been found that when a pallet is formed of similar segments which were joined with MIG or TIG welding, the temperature variations can damage the pallet or cause the pallet to change in dimension outside the tolerances allowed by the equipment such that the pallet is not capable of being used in applications requiring accurate interfacing or deep or cryogenic freezing and thawing processes. In contrast, the pallet top section that is joined with friction stir welding may have uniform contraction and/or expansion during freezing and thawing and during the welding process itself.

The method 400 includes defining mounts 123, 163 for the isolators adjacent the corners of the bulk shipper pallet 100 (Step 440). The mounts 123, 163 are holes that extend through the top sections 112, 152. The mounts 123, 163 may extend entirely through the legs 120, 160 and the top sections 112, 152. In some embodiments, the method 400 includes removing portions of the legs 120, 140, 160 such that the legs 120, 140, 160 each have a first end portion 162, a middle portion 164, and second end portion 166 opposite the first end portion as shown with respect to leg 160 in FIG. 3. The position of the mounts 123, 163 may be precisely placed such that the tolerances on the positions on the pallet 100 and relative to one another can be maintained. The tolerances of the position and coplanarity of the legs 120, 140, 160 on the pallet are mainly driven by weld distortion. Typical MIG and TIG welding operations yield a tolerance of 1.58 mm due to the weld distortion. By utilizing friction stir welding in our application tolerances of the position and coplanarity of the feet block may be held to 0.8 mm and 2 mm without requiring secondary operations such as benching or machining.

Figure 5:
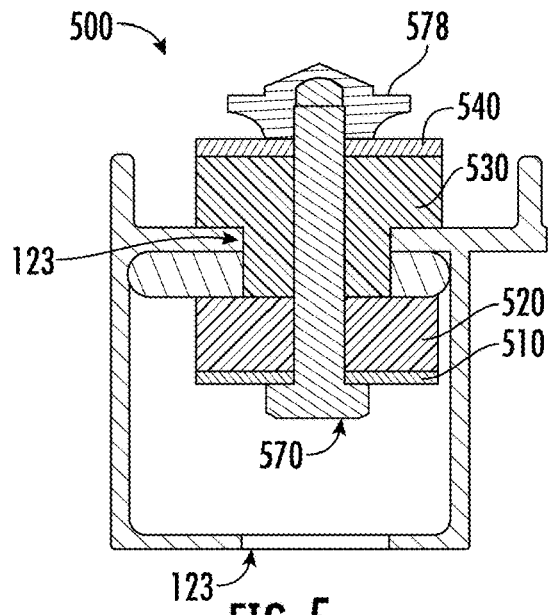
FIG. 5 is cross-sectional view of a prior art isolator secured to a portion of a pallet.

Referring now to FIG. 5, a prior art isolator 500 installed in a mount 123 is described. The isolator 500 includes a bottom plate 510, a lower section 520, an upper section 530, and a top plate 540. The isolator 500 may receive a fastener 570 that passes entirely through the bottom plate 510, the lower section 520, the upper section 530, and the top plate 540 to secure the isolator 500 within the mount 123. The fastener 570 may be secured with a mounting nut 578 that is threadably secured to an end of the fastener 570 and against the top plate 540. The mounting nut 578 may include features to position containers, e.g., containers 20 (FIG. 1), relative to the mount 123.

It has been found that when the isolator 500 is used and a pallet, e.g., pallet 100, is loaded with containers, e.g., containers 20, to form a bulk shipper assembly, the bulk shipper assembly with the isolator consistently fails the ASTM D4169 DC-2 protocol at assurance levels 1 and 2. The failure of these bulk shipper assemblies may be a result of the containers being exposed to excess forces or energy. For this reason, an improved isolator 500 may be advantageous to use in a bulk shipper assembly to allow for increased energy absorption during shipping and handling of the bulk shipper assembly.

Figure 6:
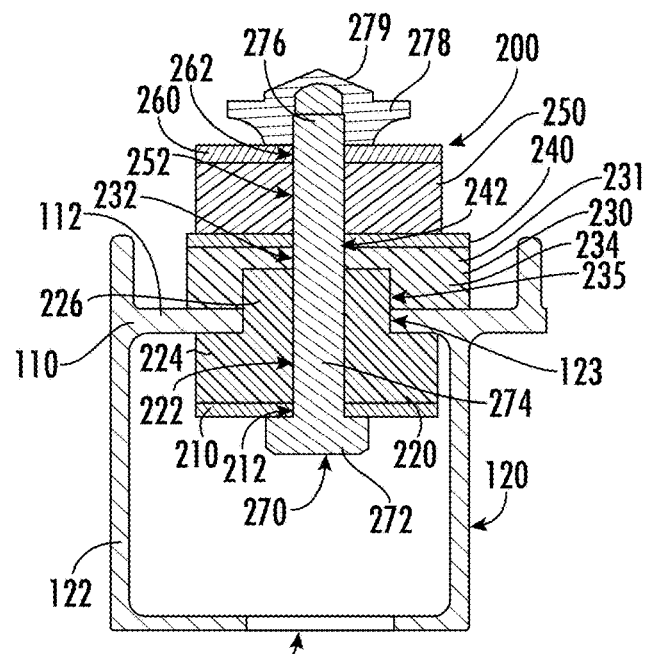
FIG. 6 is a cross-sectional view taken along the line 6-6 of FIG. 3 illustrating an isolator provided in accordance with embodiments of the present disclosure.

With reference to FIG. 6, an isolator 200 is described in accordance with the present disclosure. The isolator 200 includes a dampener section and an isolator section that both dampens and isolates containers supported on the isolator 200, e.g., containers 20, from an underlying structure, e.g., pallet 100. The isolator 200 includes a first or lower section 220, a second or middle section 230, and a third or upper section 250 that are received in a mount, e.g., mount 123, and secured together with a fastener 270 that passes through each of the lower section 220, the middle section 230, and the upper section 250.

The lower section 220 includes a first or bottom portion 224 and a second or top portion 226. The top portion 226 projects upward from the bottom portion 224 and is sized and dimensioned to pass through the mount 123 such that the top portion 226 has an outer diameter substantially the same as a diameter of the mount 123. In some embodiments, the top portion 226 may have a diameter slightly larger than the mount 123 such that the top portion 226 may be required to be pressed through the mount 123 and forms an interference fit with the mount 123. The bottom portion 224 has a diameter larger than the mount 123 such that the bottom portion 224 engages a lower surface of the elements defining the mount 123, e.g., top section 112. The top portion 226 and the bottom portion 224 may be formed of the same material or from different materials as described below. The top portion 226 and the bottom portion 224 may be of monolithic construction even when the top portion 226 and the bottom portion 224 are formed of different materials. The lower section 220 may include a bottom plate 210 that engages the bottom portion 224 and may retain a portion of the fastener 270 from passing through the lower section 220. The bottom plate 210 may distribute forces from the fastener 270 to the bottom portion 224 and/or distribute forces from the bottom portion 224 to the fastener 270.

The middle section 230 includes a top or plate portion 231 and a bottom or collar portion 234. The collar portion 234 is sized and dimensioned to receive the top portion 226 of the lower section 220 therein. As shown, the collar portion 234 has an inner diameter that defines a cavity 235 which is substantially equal to the outer diameter of the top portion 226. The inner diameter defining the cavity 235 may be slightly smaller than the outer diameter of the top portion 226 such that there is an interference fit between the collar portion 234 and the top portion 226. The interference fit may be enough to prevent slop between the collar portion 234 and the top portion 226 but not enough to create significant tension or resistance in the top portion 226 or the collar portion 234. The collar portion 234 may have an outer diameter that is larger than the outer diameter of the bottom portion 224 of the lower section 220. A lower surface of the collar portion 234 engages the element between the middle section 230 and the bottom section 220 to support the isolator 200 on the structure therebetween, e.g., top section 112 of the pallet 100. The collar portion 234 may transmit a load from the isolator 200 to the structure.

The plate portion 231 is disc shaped and disposed above and contiguous with the collar portion 234. The plate portion 231 has an outer diameter that is equal to the collar portion 234 and is disposed above the top surface of the top portion 226. The middle section 230 may include a dampener plate 240 that is disposed above and in intimate contact with a top surface of the plate portion 231. The dampener plate 240 is disposed between the upper section 250 and the middle section 230 to distribute loads between the upper section 250 and the middle section 230. The dampener plate 240 may have an outer diameter that is substantially equal to the outer diameter of the plate portion 231.

The upper section 250 is disposed above the middle section 230 such that the upper section 250 is on an opposite side of the middle section 230 from the lower section 220. The upper section 250 may be in intimate contact with a top surface of the dampener plate 240. The upper section 250 has an outer diameter that is less than the outer diameter of the middle section 230, and thus less than the outer diameter of the dampener plate 240. The outer diameter of the upper section 250 may be between an outer diameter of the middle section 230 and an outer diameter of the bottom section 220. The upper section 250 may include a top plate 260 that engages the upper section 250 and may retain a portion of the fastener 270 from passing through the upper section 250. The top plate 260 may distribute forces from the fastener 270 to the upper section 250 and/or distribute forces from the upper section 250 to the fastener 270.

The bottom section 220, the middle section 230, and the upper section 250 each cooperate to define a through passage that is sized and dimensioned to allow the fastener 270 to pass through the isolator 200. The bottom section 220, the middle section 230, and/or the upper section 250 may have an inner diameter that is substantially equal to an outer diameter of a shaft 274 of the fastener 270. The bottom section 220, the middle section 230, and/or the upper section 250 may slightly interfere with the fastener 270 while allowing the fastener 270 to pass through the isolator 200. The plates 210, 240, 260 may define openings 212, 242, 262 that allow the shaft 274 of the fastener 270 to pass through the respective plates 210, 240, 260. The fastener 270 includes a head 272 that is sized and dimensioned to engage the bottom plate 210 to prevent the fastener 270 from passing through the isolator 200. The fastener 270 also includes a mounting nut 278 that is threadedly secured to a threaded end 276 of the fastener 270 to secure the fastener 270 through the isolator 200. The mounting nut 278 may include a mounting end 279 that may be configured to engage a container and align the container with the isolator 200.

The upper section 250, the dampener plate 240, and the middle section 230 may function as a shock absorber/vibration isolator for containers supported on isolator 200. Specifically, material of the middle section 230 or the upper section 250 may be softer, e.g., more compressive, than the material of the other of the middle section 230 and the upper section 250 such that some or all of the forces exerted on the upper section 250 and the middle section 230 may be absorbed in the softer of the middle section 230 or the upper section 250. In some embodiments, the upper section 250 and or the bottom section 220 is formed of a polymer with a Shore A hardness in range of 55 to 70 and the middle section 230 formed of a polymer with a Shore A hardness in a range of 25 to 45.

Materials suitable for low temperature shock absorption/isolation are relatively known in the art, and include, without limit, silicone, silicone variants, low temperature rubber, or combinations thereof.

The material of the bottom section 220, the middle section 230, and/or the upper section 250 may be formed of polymer materials having a low glass-transition temperature. For example, the polymer materials may have a glass-transition temperature less than −80 degrees Celsius. In some embodiments, the polymer materials may be a thermoset material. For example, the polymer materials may be a silicone with a glass-transition temperature less than −80 degrees Celsius. By forming the bottom section 220, the middle section 230, and/or the upper section 250 from a polymer material having a glass-transition temperature less than −80 degrees Celsius, the isolator may perform, e.g., reduce or prevent excess energy from being transmitted to containers of a bulk shipper assembly, in a temperature range from −80 degrees Celsius to 25 degrees Celsius. By performing at temperatures as low as −80 degrees Celsius, the isolators 200 may allow for shipping and/or processing of bulk shipper assemblies at deep or cryogenic temperatures. In some embodiments, the bulk shipper assembly including the isolators 200 may perform in temperatures above 25 degrees Celsius.

Figure 7:
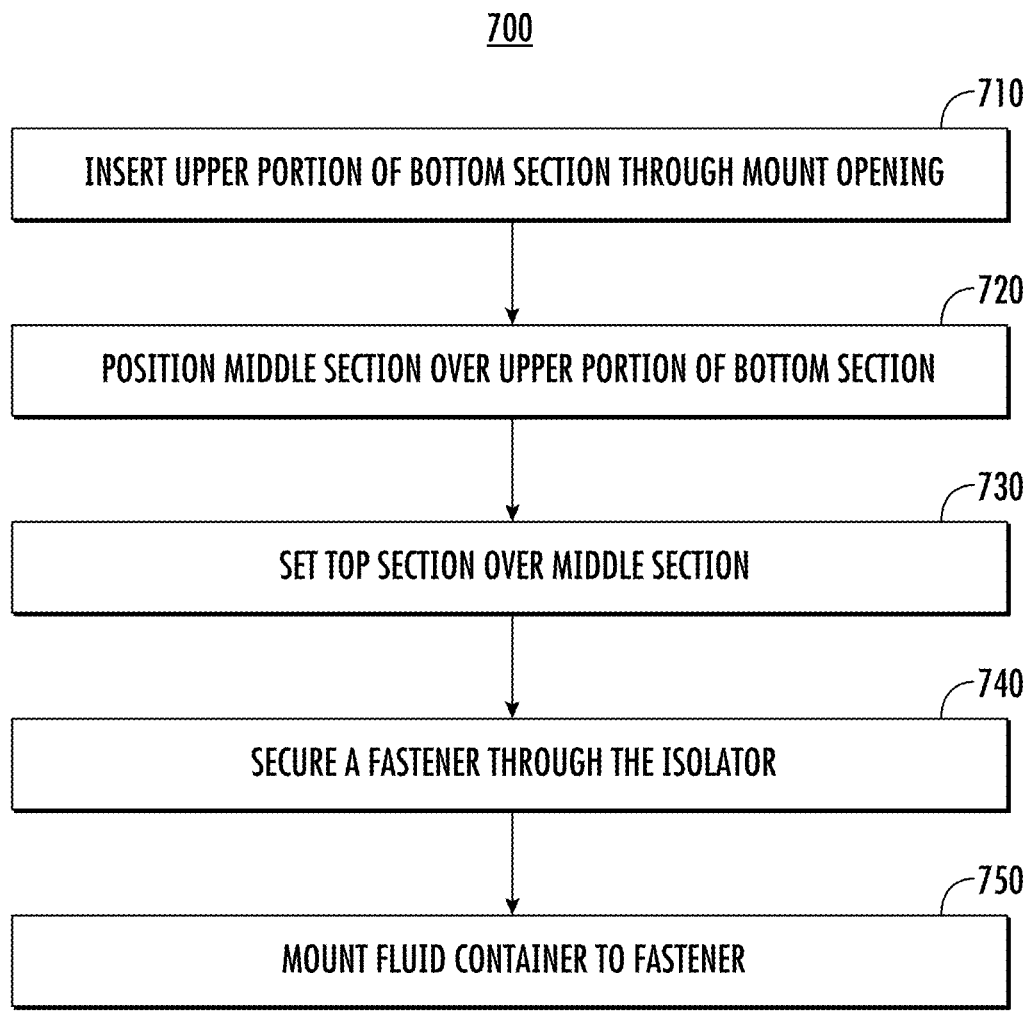
FIG. 7 is a flowchart of a method of installing an isolator provided in accordance with embodiments of the present disclosure.

Referring now to FIG. 7, a method of assembling an isolator is provided in accordance with the present disclosure and is referred to generally as method 700 and with reference to the isolator 200 of FIG. 6 and the bulk shipper assembly 10 of FIG. 1. The method 700 includes positioning a bottom section 220 of an isolator 200 within a mount 123 of a pallet 100 (Step 710). Positioning the bottom section 220 may include inserting a top portion 226 of the bottom section 220 through the mount 123 until a bottom portion 224 engages the top section 112 defining the mount 123. Inserting the top portion 226 through the mount 123 may include driving the top portion 226 through the mount 123.

When the top portion 226 of the bottom section 220 extends through the mount 123, the middle section 230 is positioned over the top portion 226 until the middle section 230 engages the top section 112 defining the mount 123 (Step 720). Positioning the middle section 230 over the top portion 226, includes receiving the top portion 226 within the cavity 235 defined by the collar portion 234. Positioning the middle section 230 over the top portion 226 may include placing the dampener plate 240 over the middle section 230. In some embodiments, the dampener plate 240 is attached to the middle section 230. With the middle section 230 positioned over the bottom section 220, the upper section 250 is set over the middle section 230 (Step 730). Positioning the upper section 250 over the middle section 230 may include the dampener plate 240 being attached to the upper section 250. In some embodiments, positioning the upper section 250 over the middle section 230, may include the top plate 260 being attached to the upper section 250. When the upper section 250 is set over the middle section 230, passages 222, 232, 252 of the sections 220, 230, 250 may be aligned within one another.

The method 700 includes securing the fastener 270 through the isolator 200 (Step 740). Securing the fastener 270 through the isolator 200 includes passing the fastener 270 through the passages 222, 232, 252 of the sections 220, 230, 250 such that a head 272 of the fastener 270 engages the bottom section 220 or a bottom plate 210 and the threaded end 276 of the fastener 270 extends from the upper section 250. When the head 272 engages the bottom section 220 or the bottom plate 210, the threaded end 276 of the fastener 270 extends from the top plate 260. The mounting nut 278 may be threaded onto the threaded end 276 of the fastener 270 to secure the fastener 270 within the isolator 200 and to secure the isolator 200 to the top section 112. The mounting nut 278 may include a mounting end 279 that aligns and supports a container to the mounting nut 278, and thus the isolator 200 and the pallet 100. The container may include one or more elements to secure the container to the isolator 200. The method 700 may include stacking one or more containers, e.g., four containers 20, on the isolators 200 secured to the pallet 100 (Step 750). When the containers are stacked on the isolators 200, the pallet 100 may be manipulated by a variety of equipment to ship, process, fill, and/or drain the containers and products within the containers.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. An isolator comprising:
   a first section configured to secure the isolator in a mount defined through a mounting section;
   a second section disposed over the first section and configured to be supported by a first surface of the mounting section;
   a third section disposed on top of the second section such that the second section is sandwiched between the first section and the third section, the second section dampening forces exerted on the third section or the first section from being transmitted therebetween; and
   a dampening plate disposed between and separating the second section from the third section, the dampening plate configured to distribute forces from the third section to the second section.

2. The isolator according to claim 1, wherein the first section includes a first portion and a second portion, the first portion sized and dimensioned to prevent the first portion from passing through the mount, the second portion extending from the first portion and sized and dimensioned to pass through the mount.

3. The isolator according to claim 2, wherein the second portion is sized and dimensioned to fill the mount.

4. The isolator according to claim 2, wherein the first portion is configured to engage a second surface of the mounting section that is opposite the first surface.

5. The isolator according to claim 2, wherein the second section includes a collar portion that defines a cavity that receives the second portion of the first section therein.

6. The isolator according to claim 5, wherein the second section includes a disc portion disposed over the collar portion and the second portion of the first section received in the cavity.

7. The isolator according to claim 1, further comprising a fastener that passes entirely through the first section, the second section, and the third section, the fastener securing the first section, the second section, and the third section together.

8. The isolator according to claim 1, wherein the first section is formed of a first material, the second section is formed of a second material, and the third section is formed of a third material, a shore hardness of the second material being less than a shore hardness of the first material or the third material.

9. The isolator according to claim 1, further comprising a top plate disposed on top of the third section, the isolator configured to support a load resting on a top surface of the top plate.

10. A bulk shipper assembly comprising:
   a pallet having a rectangular top section, the top section defining a mount passing through the top section adjacent each corner of the rectangular top section, the top section having a first surface and a second surface opposite the first surface; and
   an isolator disposed in each mount, the isolator configured to support one or more containers on the pallet, each isolator comprising:
      a first section securing the isolator in a respective mount of the pallet;
      a second section disposed over the first section and supported by the first surface of the top section such that a portion of the top section is disposed between the first section and the second section;
      a third section disposed on top of the second section such that the second section is sandwiched between the first section and the third section, the second section dampening forces exerted on the third section or the first section from being transmitted therebetween; and
      a dampening plate disposed between and separating the second section from the third section, the dampening plate configured to distribute forces from the third section to the second section.

11. The bulk shipper assembly according to claim 10, wherein the first section of each isolator includes a first portion and a second portion, the first portion disposed against the second surface of the top section to prevent the first portion from passing through the mount, the second portion extending from the first portion and passing through a respective mount of the top section.

12. The bulk shipper assembly according to claim 11, wherein the second portion of each isolator fills the respective mount.

13. The bulk shipper assembly according to claim 11, wherein the second section includes a collar portion that defines a cavity, the cavity receiving the second portion of the first section therein.

14. The bulk shipper assembly according to claim 13, wherein the second section includes a disc portion that is disposed over the collar portion and the second portion of the first section.

15. The bulk shipper assembly according to claim 10, wherein each isolator includes a fastener that passes entirely through the first section, the second section, and the third section, the fastener securing the first section, the second section, and the third section together.

16. The bulk shipper assembly according to claim 15, wherein each fastener includes a nut disposed adjacent the third section, the nut threadably coupled to a shaft of the fastener.

17. The bulk shipper assembly according to claim 16, further comprising a container mounted on the nut of each fastener such that the container is supported on the pallet, the bulk shipper assembly capable of passing ASTM D4169 DC-2 (2017) protocol at assurance levels 1 and 2.

18. The bulk shipper assembly according to claim 10, wherein the second section separates the third section from the pallet such that the third section is out of engagement with the pallet.

19. A method of assembling an isolator, the method comprising:
   inserting an upper portion of a first section of the isolator through a mount opening defined through a top segment;
   positioning a second section of the isolator over the first section and engaged with a first surface of the top segment;
   placing a dampening plate over the second section of the isolator; and
   setting a third section on the dampening plate such that the dampening plate separates the second section from the third section, the second section configured to absorb forces from the third section via the dampening plate.

20. The method according to claim 19, further comprising:
   securing a fastener through the first section, second section, and third section to secure the isolator within the mount opening; and
   mounting a fluid container on a nut of the fastener to secure the container to the isolator.

* * * * *